US012593290B2

(12) United States Patent
Kwak et al.

(10) Patent No.: US 12,593,290 B2
(45) Date of Patent: Mar. 31, 2026

(54) USING MULTIPLE SYNCHRONIZATION SOURCES TO SYNCHRONIZE SMALL CELLS

(71) Applicant: INNOWIRELESS CO., LTD.,
Seongnam-si (KR)

(72) Inventors: Young Su Kwak, Suwon-si (KR);
Seung Hwan Ji, Seongnam-si (KR)

(73) Assignee: INNOWIRELESS CO., LTD.,
Seongnam-si (KR)

( * ) Notice: Subject to any disclaimer, the term of this
patent is extended or adjusted under 35
U.S.C. 154(b) by 316 days.

(21) Appl. No.: 18/125,404

(22) Filed: Mar. 23, 2023

(65) Prior Publication Data

US 2023/0309034 A1 Sep. 28, 2023

(30) Foreign Application Priority Data

Mar. 24, 2022 (KR) ........................ 10-2022-0036726

(51) Int. Cl.
*H04W 56/00* (2009.01)
(52) U.S. Cl.
CPC ................................. *H04W 56/001* (2013.01)
(58) Field of Classification Search
CPC . H04W 56/01; H04W 16/32; H04W 56/0035;
H04J 3/0644; H04J 3/0685; H04J 3/0688
See application file for complete search history.

(56) References Cited

U.S. PATENT DOCUMENTS

| | | | | |
|---|---|---|---|---|
| 2007/0247292 | A1* | 10/2007 | Joung ................. | H04B 7/2693 |
| | | | | 340/440 |
| 2012/0050100 | A1* | 3/2012 | Huang .................. | G04R 40/06 |
| | | | | 342/357.31 |
| 2015/0373654 | A1* | 12/2015 | Yasukawa ......... | H04W 56/0055 |
| | | | | 370/338 |
| 2016/0306048 | A1* | 10/2016 | Dunn ...................... | G04G 7/00 |
| 2016/0315756 | A1* | 10/2016 | Tenea .................... | H04J 3/0667 |
| 2018/0084513 | A1* | 3/2018 | Sheashua .............. | H04W 56/00 |
| 2018/0159542 | A1* | 6/2018 | Spijker ................. | H03L 7/0991 |
| 2020/0383072 | A1* | 12/2020 | Chauhan ............. | H04W 56/001 |

FOREIGN PATENT DOCUMENTS

KR 2021-0008468 A 1/2021

* cited by examiner

*Primary Examiner* — Ian N Moore
*Assistant Examiner* — Latresa A McCallum
(74) *Attorney, Agent, or Firm* — Kaplan Breyer Schwarz,
LLP

(57) ABSTRACT

A small cell synchronization system uses multiple synchronization sources to obtain maximum performance and stability by utilizing all of the plurality of synchronization sources in a multiple small cell system having two or more different mobile communication small cells as one system and a control method thereof. The small cell synchronization system includes: an oscillator providing a system clock signal of a predetermined frequency; and a synchronization management module that collectively manages multiple synchronization sources, and determines the 'synchronized PPS' according to a result of comparing the 'synchronized PPS' with the PPS for each synchronization source using the system clock and provides it to each small cell along with the system clock.

12 Claims, 4 Drawing Sheets

Figure 4:
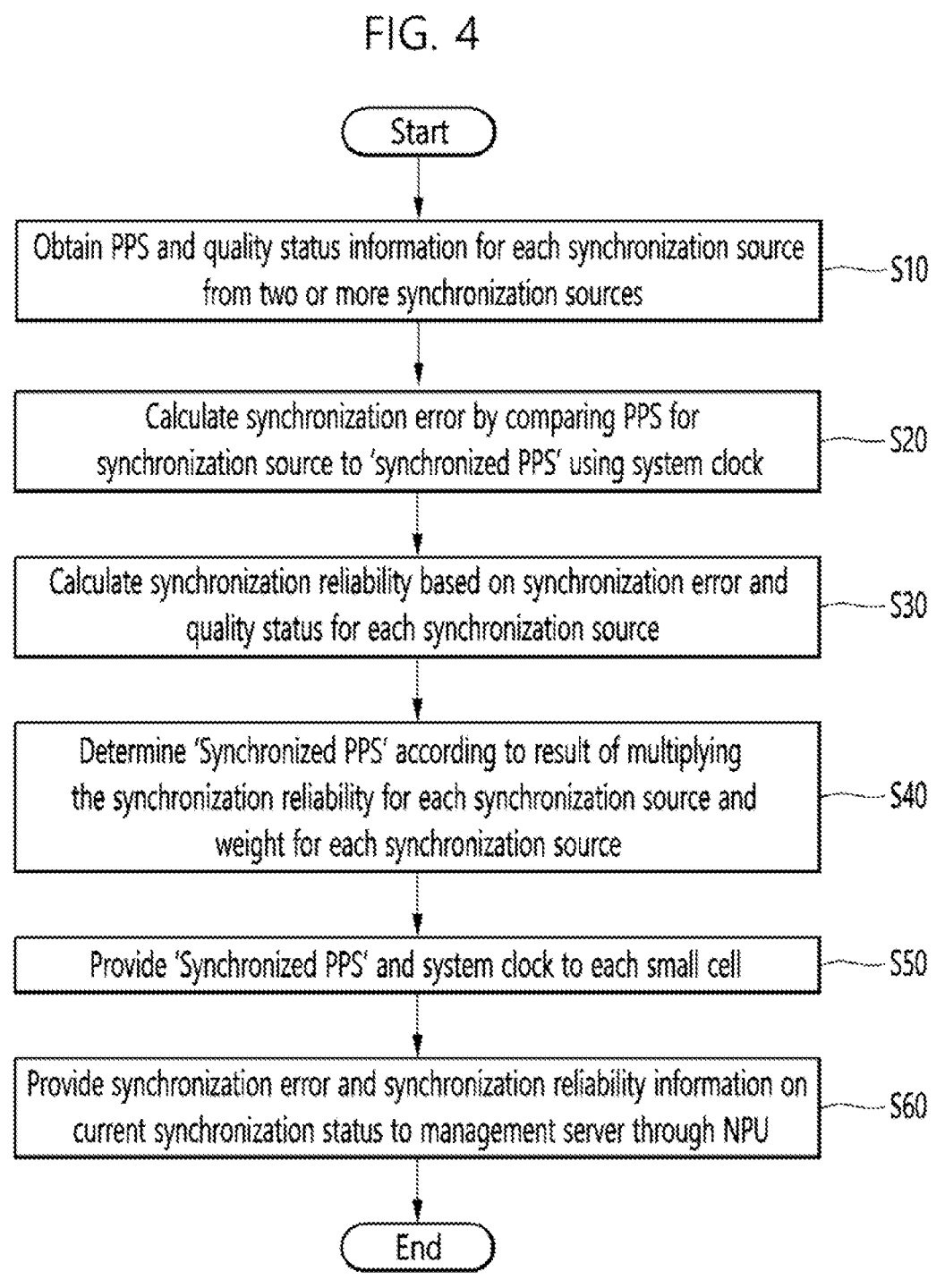

Start

Obtain PPS and quality status information for each synchronization source from two or more synchronization sources — S10

Calculate synchronization error by comparing PPS for synchronization source to 'synchronized PPS' using system clock — S20

Calculate synchronization reliability based on synchronization error and quality status for each synchronization source — S30

Determine 'Synchronized PPS' according to result of multiplying the synchronization reliability for each synchronization source and weight for each synchronization source — S40

Provide 'Synchronized PPS' and system clock to each small cell — S50

Provide synchronization error and synchronization reliability information on current synchronization status to management server through NPU — S60

End

USING MULTIPLE SYNCHRONIZATION SOURCES TO SYNCHRONIZE SMALL CELLS

CROSS-REFERENCE TO RELATED APPLICATION

This application claims priority to and the benefit of Korean Patent Application No. 10-2022-0036726, filed on Mar. 24, 2022, the disclosure of which is incorporated herein by reference in its entirety.

FIELD

The present disclosure relates to a small cell synchronization system using multiple synchronization sources, and more particularly, to a small cell synchronization system using multiple synchronization sources to obtain maximum performance and stability by utilizing all of the plurality of synchronization sources in a multiple small cell system composed of two or more different mobile communication small cells as one system and a control method thereof.

BACKGROUND

As is well known, a small cell is a small base station to solve matters such as communication quality deterioration and shadow area occurrence by reducing the operating range (cell size) by locating a terminal close to the base station, and since the terminal is located close to the base station, power consumption of the terminal may be reduced, and installation and maintenance costs are lower than those of the existing base station. It may be classified into metro cell, micro cell, pico cell, and femto cell according to the scope and purpose of use, and it may be classified into home, enterprise, and hotspot depending on the installation area and service purpose.

As 5 generation (5G) New Radio (NR) is introduced and the use of a Time Division Duplex (TDD) method becomes common, the importance of timing and frequency synchronization between small cells or between a small cell and a base station is increasing.

For example, Synchronization characteristics required for each technology according to diversified use cases, such as the need to support applications that were previously supported by wired/non-standard wireless technologies, such as Critical Internet of Thing (IoT) or industrial automation IoT services may be different, and accordingly, a radio access network (RAN) needs to support a service combining various types of use cases and promote balance optimization for precision, availability, and cost of time resources. In addition, when using the Time Division Duplex (TDD) method, time & phase alignment between the two small cells is unconditionally required to prevent interference.

Meanwhile, timing and frequency synchronization may be obtained by various synchronization sources such as a global navigation satellite system (GNSS) such as Global Positioning System (GPS), network (point to point (PTP), and the like), NL (Network Listening; by reception of signals from other base stations), and the like, and since the location or case where the small cell may be installed is determined according to the synchronization method available in the small cell, if support for various synchronization methods and high synchronization performance are possible, the range and number of small cells used will increase, helping to expand the market.

In particular, when Long-term evolution (LTE) and 5G NR or Sub-6 GHz of 5G NR and millimeter wave (mm-Wave) small cells are configured as one system, the types and performance of synchronization methods that may be provided by each small cell solution may be different, and when it is impossible to share a synchronization source between small cells, it may be difficult to obtain synchronization efficiently.

FIG. 1 is a block diagram of a small cell synchronization system in the related art supporting 4G LTE and 5G New Radio (NR) at the same time. As shown in FIG. 1, a small cell synchronization system that simultaneously supports 4G LTE and 5G New Radio (NR) in the related art may include: for example, an oscillator that provides a system clock signal of a predetermined frequency, for example, 38.4 megahertz (MHz), independently of the LTE small cell 100 and the 5G NR small cell 200, each implemented in a one-chip form and supporting the LTE mobile communication service and the 5G NR mobile communication service, preferably, VCTCXO (Voltage Controlled Temperature Compensated Crystal Oscillator) 310, 320; an RF distributor 330 that receives GPS data, that is, GPS time information and coordinate information, from an external GNSS system, for example, a GPS system, through a corresponding antenna port and then distributes them to the LTE small cell 100 and the 5G NR small cell 200; a GPON SFP (Small Form-factor Pluggable) transceiver 340 having a Gigabit Passive Optical Network (GPON) port and receiving a GPON PPS (Pulse Per Second) signal; an Ethernet PHY module 350 that communicates with a Precise Time Protocol (PTP) server through an Ethernet port to receive synchronization signals, that is, PTP packets and synchronization clock signals (SyncE), and provide them to the LTE small cell 100 and the 5G NR small cell 200; LTE RF transceiver 370 and 5G NR transceiver 380 receiving synchronization signals from neighboring base stations through NL (Network Listening) technology and providing them to the LTE small cell 100 and the 5G NR small cell 200, respectively; and a network processor unit (NPU) 360 that performs communication and control functions such as various functions necessary for a multiple small cell system, such as operation monitoring of each small cell, synchronization maintenance, firmware update, and network switching.

According to the small cell synchronization system in the related art using multiple synchronization sources having the above configuration, even when a single base station system is configured with a 4G LTE small cell and a 5G NR small cell or a 5G NR Sub-6 GHz small cell and a mmWave small cell, synchronization is operated for each small cell by each synchronization source, and if the synchronization method supported by each small cell is not the same, the synchronization source used or available for each small cell may be different, and accordingly, even in one system, synchronization performance or status may be different for each small cell.

In addition, when a 1 PPS synchronization signal is obtained using one antenna, such as GNSS, reception performance may deteriorate due to loss because one antenna input must be distributed to several small cells through an RF distributor.

Even if synchronization by LTE NL may be used for LTE small cell, it may not be used for 5G NR small cell, and vice versa. In addition, it is difficult to improve to support additional synchronization source such as external PPS.

Literature in the Related Art

Literature 1 in the related art: Korean Patent Application Publication No. 10-2021-0008468 (Title of Invention:

Communication Node and Communication System Performing Clock Synchronization)

SUMMARY

Technical Goals

The present disclosure was made to solve the above matters, and the present disclosure is for the purpose of providing a small cell synchronization system using multiple synchronization sources to obtain maximum performance and stability by utilizing all of the plurality of synchronization sources in a multiple small cell system composed of two or more different mobile communication small cells as one system and its control method thereof.

Technical Solutions

In order to achieve the above matter, the present disclosure provides a small cell synchronization system using multiple synchronization sources of a multiple small cell system in which two or more different mobile communication small cells using two or more multiple synchronization sources form one system, which is including: an oscillator providing a system clock signal of a predetermined frequency; and a synchronization management module that collectively manages multiple synchronization sources, and determines the 'synchronized PPS' according to a result of comparing the 'synchronized PPS' with the PPS for each synchronization source using the system clock and provides it to each small cell along with the system clock.

In the above configuration, the multiple synchronization sources are made up of at least two of the synchronization signal provided from the GNSS module (GNSS PPS), the synchronization signal provided from the Ethernet PHY module (PTP/SyncE), and the synchronization signal provided from the GPON SFP transceiver (GPON PPS).

The multiple synchronization sources are synchronization signals (NL PPS) provided through neighboring base stations of each small cell through NL technology.

Synchronization management module may include: a synchronization error calculation part comparing each synchronization source with 'synchronized PPS' through a system clock to calculate a synchronization error; a synchronization reliability calculation part for calculating synchronization reliability based on the synchronization error for each synchronization source calculated by the synchronization error calculation part and the quality status information provided from each synchronization source; a weight setting part that sets weights for each synchronization source; a synchronization determination part that determines a 'synchronized PPS' according to a result of multiplying the synchronization reliability of each synchronization source calculated by the synchronization reliability calculation part by the weight of each synchronization source set by the weight setting part; and a synchronization providing part that provides 'synchronized PPS' determined by the synchronization determining part and the system clock to each small cell.

The synchronization determination part determines one synchronization source having the maximum multiplication result as 'synchronized PPS' or determines a synchronization source generated by combining each multiplication result as 'synchronized PPS'.

A network processor unit (NPU) performing communication and control functions including operation monitoring, synchronization maintenance, firmware update, and network switching of each small cell is further provided.

The synchronization providing part provides synchronization error information and synchronization reliability information for the current synchronization status to the NPU.

The multiple small cell system consists of LTE small cells and 5G NR small cells or 5G NR Sub-6 GHz small cells and mmWave small cells.

Another feature of the present disclosure relates to a method for controlling a small cell synchronization system using multiple synchronization sources, which is performed by a synchronization management module provided in a multiple small cell synchronization system in which two or more different mobile communication small cells using two or more multiple synchronization sources form one system and overall manages multiple synchronization sources, including: (a) obtaining PPS and quality status information for each synchronization source from two or more synchronization sources; (b) calculating a synchronization error by comparing the PPS for each synchronization source with the 'synchronized PPS' through the system clock; (c) calculating synchronization reliability for each synchronization source based on the synchronization error and quality status for each synchronization source; and (d) determining a 'synchronized PPS' according to a result of multiplying the synchronization reliability for each synchronization source by the weight assigned to each synchronization, and then providing the determined 'synchronized PPS' and system clock to each small cell.

In the above configuration, the multiple synchronization sources are made up of at least two of the synchronization signal provided from the GNSS module (GNSS PPS), the synchronization signal provided from the Ethernet PHY module (PTP/SyncE), and the synchronization signal provided from the GPON SFP transceiver (GPON PPS).

The multiple synchronization sources are synchronization signals (NL PPS) provided through neighboring base stations of each small cell through NL technology.

The 'synchronized PPS' in operation (d) is determined as one synchronization source having the maximum multiplication result or a synchronization source generated by combining each multiplication result.

An operation of transmitting synchronization error and synchronization reliability information on the current synchronization status to the management server through the NPU is further included.

The multiple small cell system consists of LTE small cells and 5G NR small cells or 5G NR Sub-6 GHz small cells and mmWave small cells.

Effects

According to the small cell synchronization system using multiple synchronization sources and control method thereof in the present disclosure, when a system is configured with two or more small cells and multiple synchronization sources are used, a synchronization may be obtained even when the synchronization schemes supported by each small cell are not the same because it may provide synchronization of the same performance and status as all small cells and may support all multiple synchronization sources.

In addition, since synchronized system clock with the same performance may be provided to multiple small cells, and synchronization is obtained using a single VCTCXO, it is easy to improve synchronization and holdover performance and reduce cost when using a high-performance VCTCXO.

In addition, it is easy to improve to support additional synchronization sources such as external PPS, and synchronization by LTE NL may be used in both LTE small cells and 5G NR small cells, and vice versa.

In addition, when synchronization is obtained using one antenna, such as in GNSS, reception performance is not degraded due to distribution loss because one antenna input is not distributed to several small cells.

In this way, since two or more small cells may utilize all of the multiple synchronization sources, synchronization stability is increased, and as a result, it may be advantageous to select a place or condition in which the small cells may be installed.

Furthermore, synchronization and holdover performance may be improved by applying an algorithm that utilizes all of the multiple synchronization sources by the algorithm of the synchronization module, and it is easy to adopt advanced algorithms such as AI for the synchronization module because it uses an independent synchronization module rather than a small cell that is limited in hardware or chipset and functional configuration accordingly.

BRIEF DESCRIPTION OF THE DRAWING

FIG. 3 is a functional block diagram of a synchronization management module in a small cell synchronization system using multiple synchronization sources of the present disclosure.

FIG. 4 is a flowchart illustrating a small cell synchronization control method using multiple synchronization sources of the present disclosure.

DETAILED DESCRIPTION

Terminology used herein is for describing the example embodiments and is not intended to limit the present disclosure. The suffixes "module" and "part" for the components used in the above description are given only in consideration of the ease of writing the specification, and do not have meanings or roles that are distinguished from each other by themselves.

Terms such as "~part", "~unit", "~er", and "~module" described in this specification mean a unit that processes at least one function or operation, which may be implemented by hardware, such as a processor, Micro Processor, Micro Controller, CPU (Central Processing Unit), GPU (Graphics Processing Unit), APU (Accelerate Processor Unit), DSP (Digital Signal Processor), ASIC (Application Specific Integrated Circuit), FPGA (Field Programmable Gate Array), or software, or a combination of hardware and software, and may be implemented in a form combined with a memory storing data necessary for processing at least one function or operation.

It should be understood that when a certain component is referred to as being "linked" or "connected" to another component, it may be directly linked or connected to the other component, but other components may exist in the middle. On the other hand, when a component is referred to as "directly linked" or "directly connected" to another component, it should be understood that no other components exist in the middle.

Singular expressions include plural expressions unless the context clearly dictates otherwise.

In this disclosure, terms such as "comprise" or "have" are intended to designate that there is a feature, number, step, operation, component, part, or combination thereof described in the specification, but it should be understood that it does not preclude the possibility of the presence or addition of one or more other features, numbers, steps, operations, components, parts, or combinations thereof.

Also, the term 'or' means an inclusive OR rather than an exclusive OR.

Hereinafter, a preferred example embodiment of a small cell synchronization system using multiple synchronization sources and a control method thereof according to the present disclosure will be described in detail with reference to the accompanying drawings.

Figure 1:
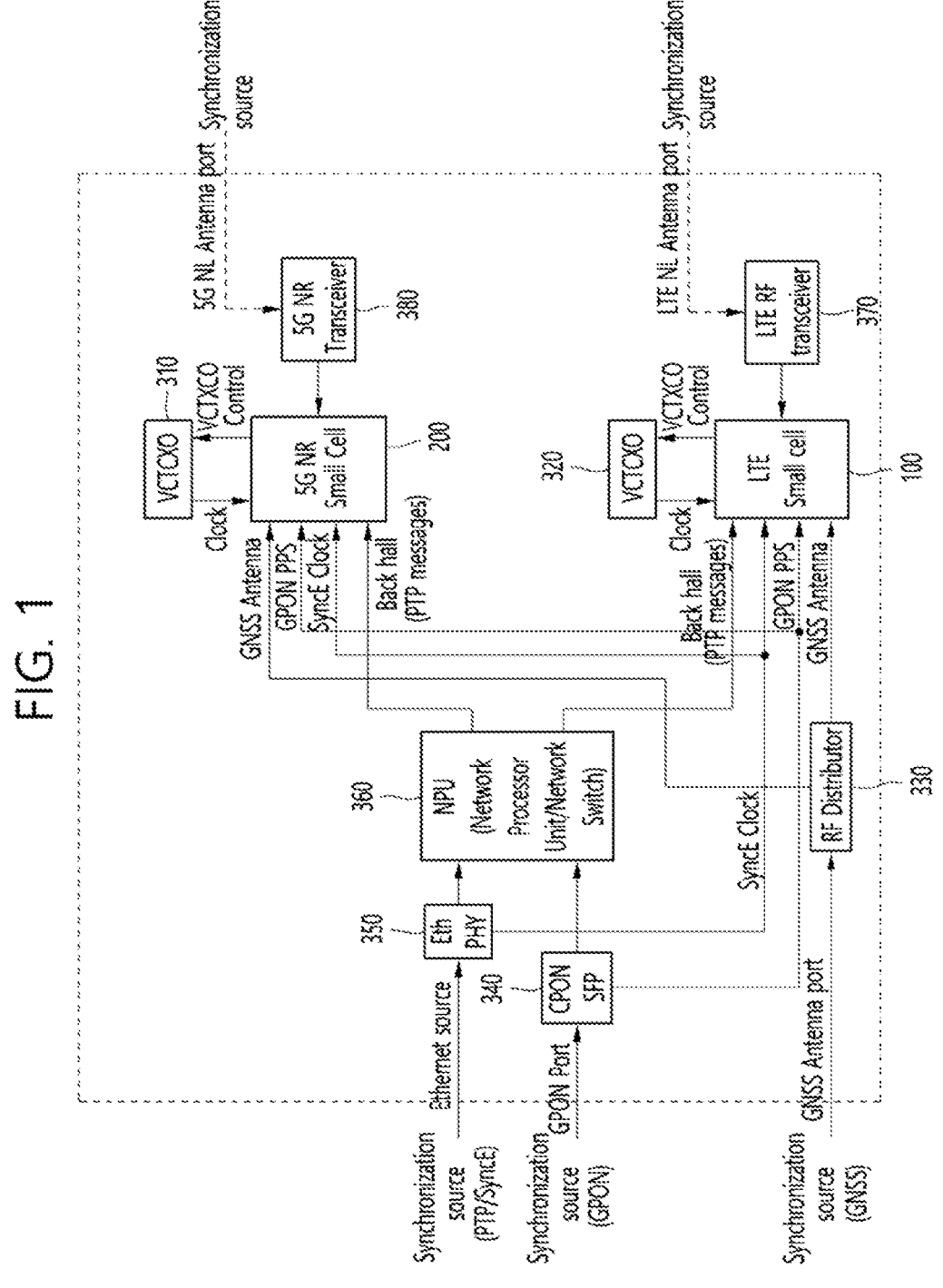
FIG. 1 is a block diagram of a small cell synchronization system in the related art supporting 4G LTE and 5G NR at the same time.
Figure 2:
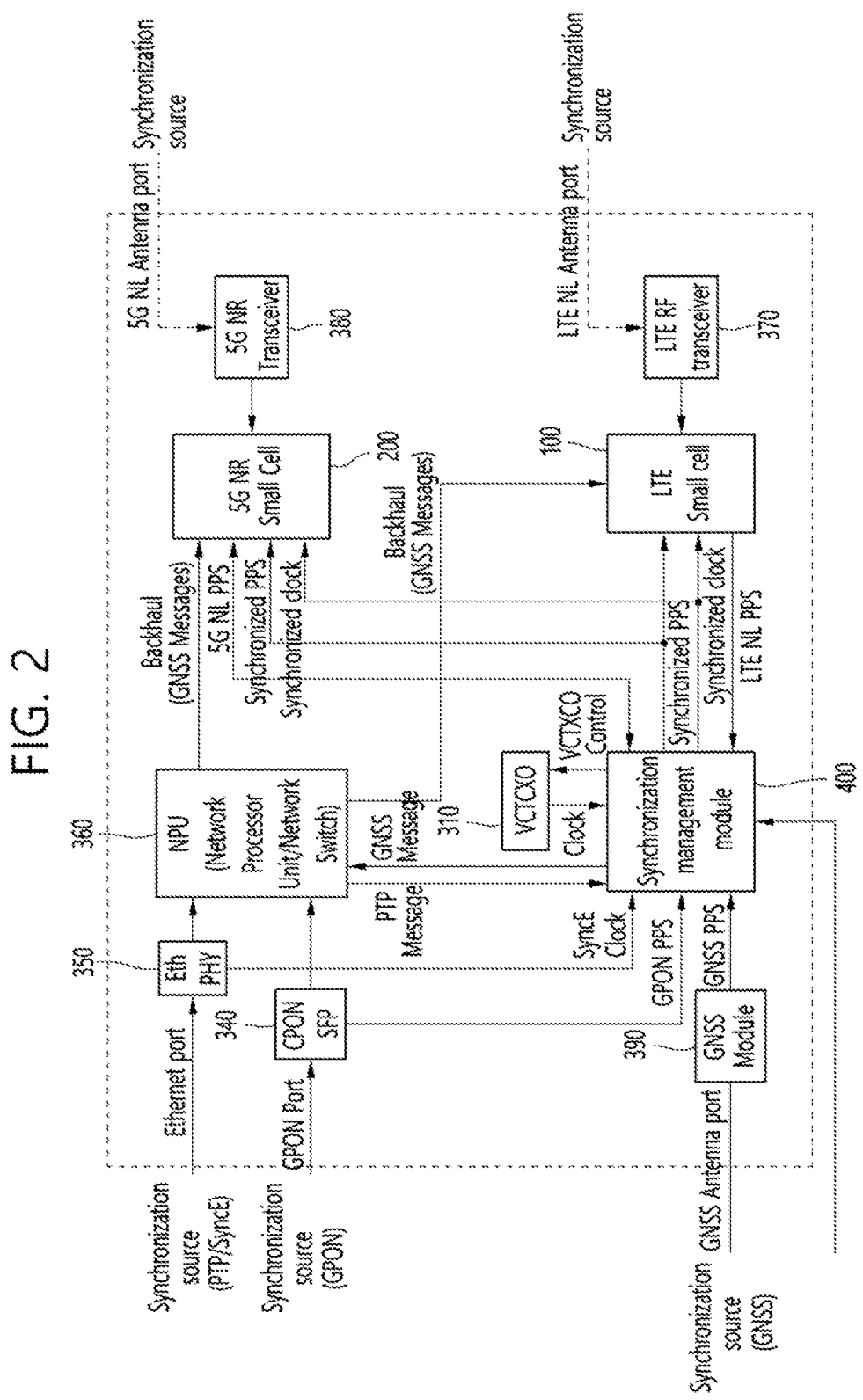
FIG. 2 is a block diagram of a small cell synchronization system using multiple synchronization sources according to the present disclosure.

FIG. 2 is a block diagram of a small cell synchronization system using multiple synchronization sources according to the present disclosure, in which a synchronization provided to multiple small cells, for example, the LTE small cell 100 and the 5G NR small cell 200 which are implemented in a one-chip form respectively to support LTE mobile communication service and 5G NR mobile communication service is determined under the control of the synchronization management module 400 that collectively manages multiple synchronization sources.

As shown in FIG. 2, the small cell synchronization system using multiple synchronization sources of the present disclosure may include: an oscillator, preferably a Voltage Controlled Temperature Compensated Crystal Oscillator (VCTCXO) 310 providing a system clock signal of a predetermined frequency, for example, 38.4 MHz to the synchronization management module 400; a GNSS module 390 that receives GPS data, that is, GPS time information and coordinate information, from an external GNSS system, for example, a GPS system, through a corresponding antenna port and provides them to the synchronization management module 400; a GPON SFP transceiver 340 receiving GPON PPS signals through the GPON port and providing them to the synchronization management module 400; Ethernet PHY module 350 that communicates with the PTP server through the Ethernet port to receive synchronization signals, that is, PTP packets and synchronization clock signals (SyncE), and provide them to the synchronization management module 400; LTE RF transceiver 370 and 5G NR transceiver 380 receiving synchronization signals from neighboring base stations through NL (Network Listening) technology and providing them to the LTE small cell 100 and the 5G NR small cell 200, respectively; and NPU (Network Processor Unit) 360 that performs various functions necessary for a multiple small cell system, for example, communication and control functions such as operation monitoring, synchronization maintenance, firmware update, and network switching of each small cell.

Figure 3:
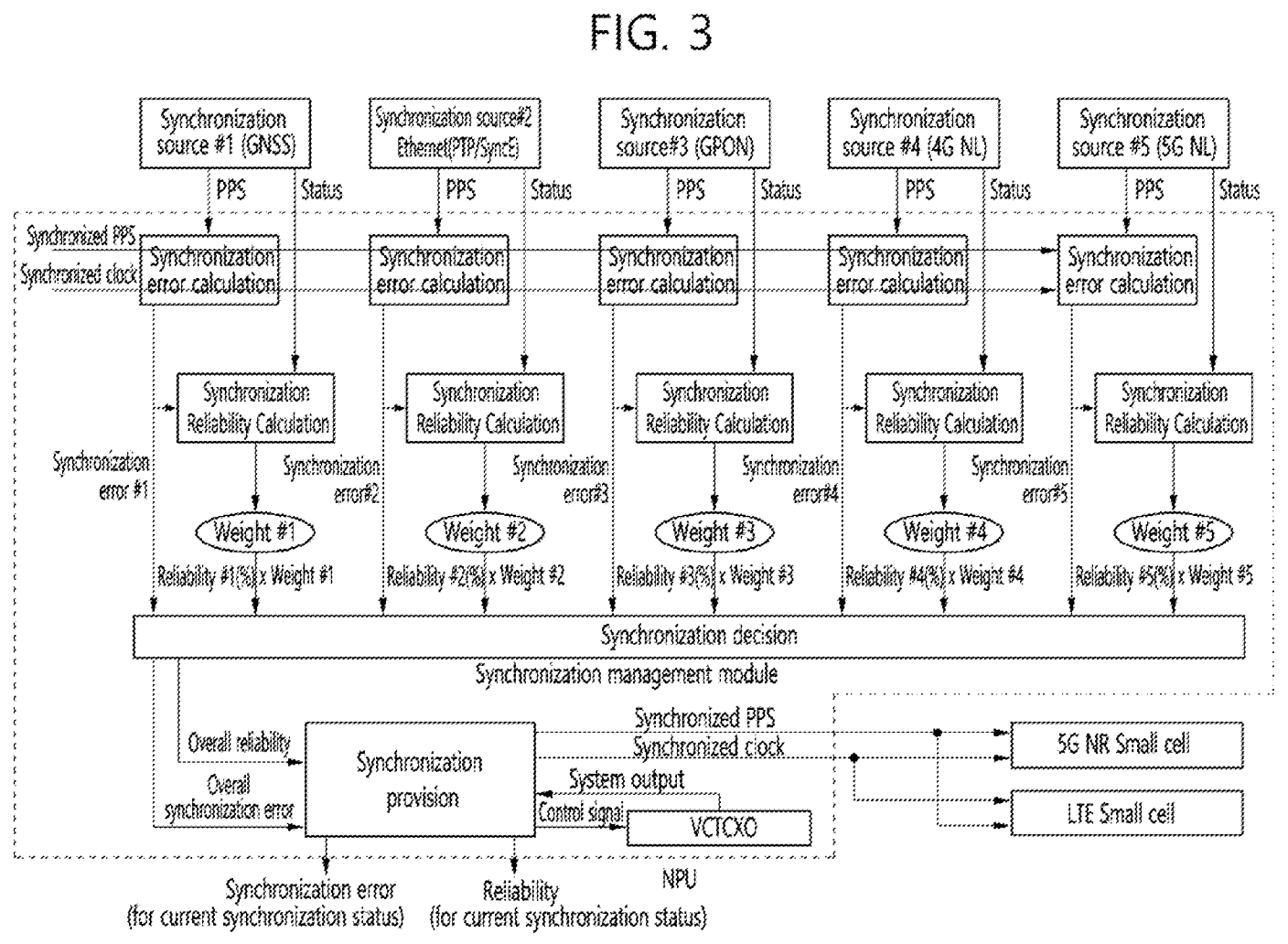

FIG. 3 is a functional block diagram of a synchronization management module in a small cell synchronization system using multiple synchronization sources according to the present disclosure. As shown in FIG. 3, in the small cell synchronization system using multiple synchronization sources of the present disclosure, the synchronization management module 400 may include: a synchronization error calculation part for calculating a synchronization error by comparing multiple synchronization sources, for example, a synchronization signal provided from the GNSS module 390

(GNSS PPS), a synchronization signal provided from the Ethernet PHY module 350 (PTP/SyncE), a synchronization signal provided from the GPON SFP transceiver 340 (GPON PPS), synchronization signal provided from the LTE small cell 100 (LTE NL PPS) and synchronization signal provided from the 5G NR small cell 200 (5G NR PPS), with 'synchronized PPS' through a system dock signal described later; a synchronization reliability calculation part for calculating synchronization reliability based on the synchronization error for each synchronization source calculated by the synchronization error calculation part and quality status information provided from each synchronization source; a weight setting part for setting weights for each synchronization source; a synchronization determination part that determines one synchronization source as 'synchronized PPS' according to the result of multiplying the synchronization reliability of each synchronization source calculated by the synchronization reliability calculation part with the weight of each synchronization source set by the weight setting part or determines a synchronization source generated by combining the respective multiplication results as 'synchronized PPS', and provides overall error and overall reliability for multiple synchronization sources; synchronization providing part for providing synchronization error information and synchronization reliability information on the current synchronization status to the NPU 360 along with providing the 'synchronized PPS' determined by the synchronization determination part and system clock to the LTE small cell 100 and the 5G NR small cell 200.

Meanwhile, the NPU 360 transmits synchronization error information and synchronization reliability information on the current synchronization status received from the synchronization providing part to an external management server to take necessary actions.

FIG. 4 is a flowchart for explaining a small cell synchronization control method using multiple synchronization sources according to the present disclosure, which may be performed at predetermined cycles by a synchronization management module.

As shown in FIG. 4, according to the small cell synchronization control method using multiple synchronization sources of the present disclosure, in operation S10, PPS and quality status information for each synchronization source are obtained from two or more synchronization sources as described above, and, in operation S20, a synchronization error is calculated by comparing the PPS for each synchronization source with the 'synchronized PPS' through a system clock, for example, a 38.4 MHz system clock signal provided from the VCTCXO.

Next, in operation S30, synchronization reliability for each synchronization source is calculated based on the synchronization error and quality status for each synchronization source. In operation S40, a 'synchronized PPS' is determined according to a result obtained by multiplying the synchronization reliability for each synchronization source by the weight assigned to each synchronization source, and, here, the 'synchronized PPS' may be determined as one synchronization source having the maximum multiplication result or a synchronization source generated by combining respective multiplication results.

Next, in operation S50, the determined 'synchronized PPS' and system clock are provided to each small cell.

Finally, in operation S60, the synchronization error and synchronization reliability information for the current synchronization status are delivered to the management server through the NPU.

In the above, with reference to the accompanying drawings, a preferred example embodiments of the small cell synchronization system using multiple synchronization sources of the present disclosure and the control method thereof have been described in detail, but this is only an example, and various modifications and changes will be possible within the scope of the technical idea of the present disclosure. Therefore, the scope of the present disclosure will be determined by the description of the claims below.

What is claimed is:

1. A small cell synchronization system using multiple synchronization sources of a multiple small cell system in which two or more different mobile communication small cells using two or more multiple synchronization sources form one system, comprising:

an oscillator providing a system clock signal of a predetermined frequency; and a synchronization management module that collectively manages multiple synchronization sources, and determines a new synchronized Pulse Per Second (PPS) according to a result of comparing a previous synchronized PPS with a PPS for each synchronization source using the system clock and provides it to each small cell along with the system clock, the synchronization management module including:

a synchronization error calculation part comparing each synchronization source with the previous synchronized PPS through a system clock to calculate a synchronization error;

a synchronization reliability calculation part for calculating synchronization reliability based on the synchronization error for each synchronization source calculated by the synchronization error calculation part and the quality status information provided from each synchronization source;

a weight setting part that sets weights for each synchronization source;

a synchronization determination part that determines the new synchronized PPS according to a result of multiplying the synchronization reliability of each synchronization source calculated by the synchronization reliability calculation part by the weight of each synchronization source set by the weight setting part; and a synchronization providing part that provides the new synchronized PPS determined by the synchronization determining part and the system clock to each small cell.

2. The small cell synchronization system using multiple synchronization sources of claim 1, wherein:

the multiple synchronization sources are made up of at least two of the synchronization signals provided from a global navigation satellite system (GNSS) module (GNSS PPS), the synchronization signal provided from an Ethernet physical layer (PHY) module (Precise Time Protocol/synchronization clock signals (PTP/SyncE)), and the synchronization signal provided from a Gigabit Passive Optical Network Small Form-factor Pluggable (GPON SFP) transceiver (GPON PPS).

3. The small cell synchronization system using multiple synchronization sources of claim 2, wherein:

the multiple synchronization sources are synchronization signals (Network Listening (NL) PPS) provided through neighboring base stations of each small cell through NL technology.

4. The small cell synchronization system using multiple synchronization sources of claim 1, wherein:

the synchronization determination part determines one synchronization source having the maximum multiplication result as the new synchronized PPS or determines a synchronization source generated by combining each multiplication result as the new synchronized PPS.

5. The small cell synchronization system using multiple synchronization sources of claim 4, further comprising:
a network processor unit (NPU) performing communication and control functions including operation monitoring, synchronization maintenance, firmware update, and network switching of each small cell.

6. The small cell synchronization system using multiple synchronization sources of claim 5, wherein:
the synchronization providing part provides synchronization error information and synchronization reliability information for the current synchronization status to the NPU.

7. The small cell synchronization system using multiple synchronization sources of claim 6, wherein:
the multiple small cell system includes Long-term evolution (LTE) small cells and 5 generation new radio (5G NR) small cells or 5G NR Sub-6 GHZ small cells and millimeter wave (mmWave) small cells.

8. A method for controlling a small cell synchronization system using multiple synchronization sources, which is performed by a synchronization management module provided in a multiple small cell synchronization system in which two or more different mobile communication small cells using two or more multiple synchronization sources form one system and collectively manages multiple synchronization sources, the method comprising:
(a) obtaining a Pulse Per Second (PPS) and quality status information for each synchronization source from two or more synchronization sources;
(b) calculating a synchronization error by comparing the PPS for each synchronization source with a previous synchronized PPS through the system clock;
(c) calculating synchronization reliability for each synchronization source based on the synchronization error and quality status for each synchronization source; and
(d) determining a new synchronized PPS according to a result of multiplying the synchronization reliability for each synchronization source by the weight assigned to each synchronization, and then providing the new synchronized PPS and system clock to each small cell, wherein the new synchronized PPS is determined as one synchronization source having the maximum multiplication result or as a synchronization source generated by combining each multiplication result.

9. The method for controlling a small cell synchronization system using multiple synchronization sources of claim 8, wherein:
the multiple synchronization sources are made up of at least two of the synchronization signals provided from a global navigation satellite system (GNSS) module (GNSS PPS), the synchronization signal provided from an Ethernet physical layer (PHY) module (Precise Time Protocol/synchronization clock signals (PTP/SyncE)), and the synchronization signal provided from a Gigabit Passive Optical Network Small Form-factor Pluggable (GPON SFP) transceiver (GPON PPS).

10. The method for controlling a small cell synchronization system using multiple synchronization sources of claim 9, wherein:
the multiple synchronization sources are synchronization signals (Network Listening (NL) PPS) provided through neighboring base stations of each small cell through NL technology.

11. The method for controlling a small cell synchronization system using multiple synchronization sources of claim 8, further comprising:
transmitting synchronization error and synchronization reliability information on the current synchronization status to the management server through a network processor unit (NPU).

12. The method for controlling a small cell synchronization system using multiple synchronization sources of claim 11, wherein:
the multiple small cell system includes Long-term evolution (LTE) small cells and 5 generation new radio (5B NR) small cells or 5G NR Sub-6 GHz small cells and millimeter wave (mmWave) small cells.

* * * * *